United States Patent
Vogel

[15] 3,699,827
[45] Oct. 24, 1972

[54] AXIAL ACTUATOR AND FORCE CONTROL FOR ROTARY MEMBERS, ESPECIALLY VARIABLE SPEED DRIVES

[72] Inventor: Hilmar Vogel, Gartenstrasse 1E, 8033 Krailling b. Munich, Germany

[22] Filed: July 9, 1971

[21] Appl. No.: 161,072

[52] U.S. Cl. .................................... 74/230.17 C
[51] Int. Cl. ............................................. F16h 9/00
[58] Field of Search ............... 74/230.17 B, 230.17 C

[56] References Cited

UNITED STATES PATENTS

| | | | |
|---|---|---|---|
| 2,203,149 | 6/1940 | Hoover | 74/230.17 C |
| 2,852,951 | 9/1958 | Miner | 74/230.17 C |
| 2,976,739 | 3/1961 | Lewellen et al. | 74/230.17 C |

FOREIGN PATENTS OR APPLICATIONS

| | | | |
|---|---|---|---|
| 1,182,574 | 1/1959 | France | 74/230.17 C |

Primary Examiner—C. J. Husar
Attorney—Karl F. Ross

[57] ABSTRACT

An axial actuator or torque-responsive contact-pressure control, especially for variable-speed drives having a sheave with at least one axially movable disk for varying the pitch diameter of a transmission system having a flexible member interconnecting the adjustable sheave with a further sheave, e.g., a belt or chain transmission. The actuator or torque-responsive control, which has a relatively small mass and substantially no play, comprises a radial pressure pin shiftable along the axis of the adjustable sheave and/or angularly displaceable relative thereto and within a body defining a surface of revolution with an axis lying along a radius. A pair of pressure shoes have surfaces of a radius of curvature corresponding to that of the surface of revolution and planar flanks tangential to the pressure pin, while being received between the latter and the soffit of the surface of revolution so that the angle of attack of the pressure pin on the pressure shoes is varied in accordance with the position of the movable sheave disk. A force-transmitting system between the latter disk and the pressure shoes defines the ratio of pressure-pin movement to disk movement.

11 Claims, 13 Drawing Figures

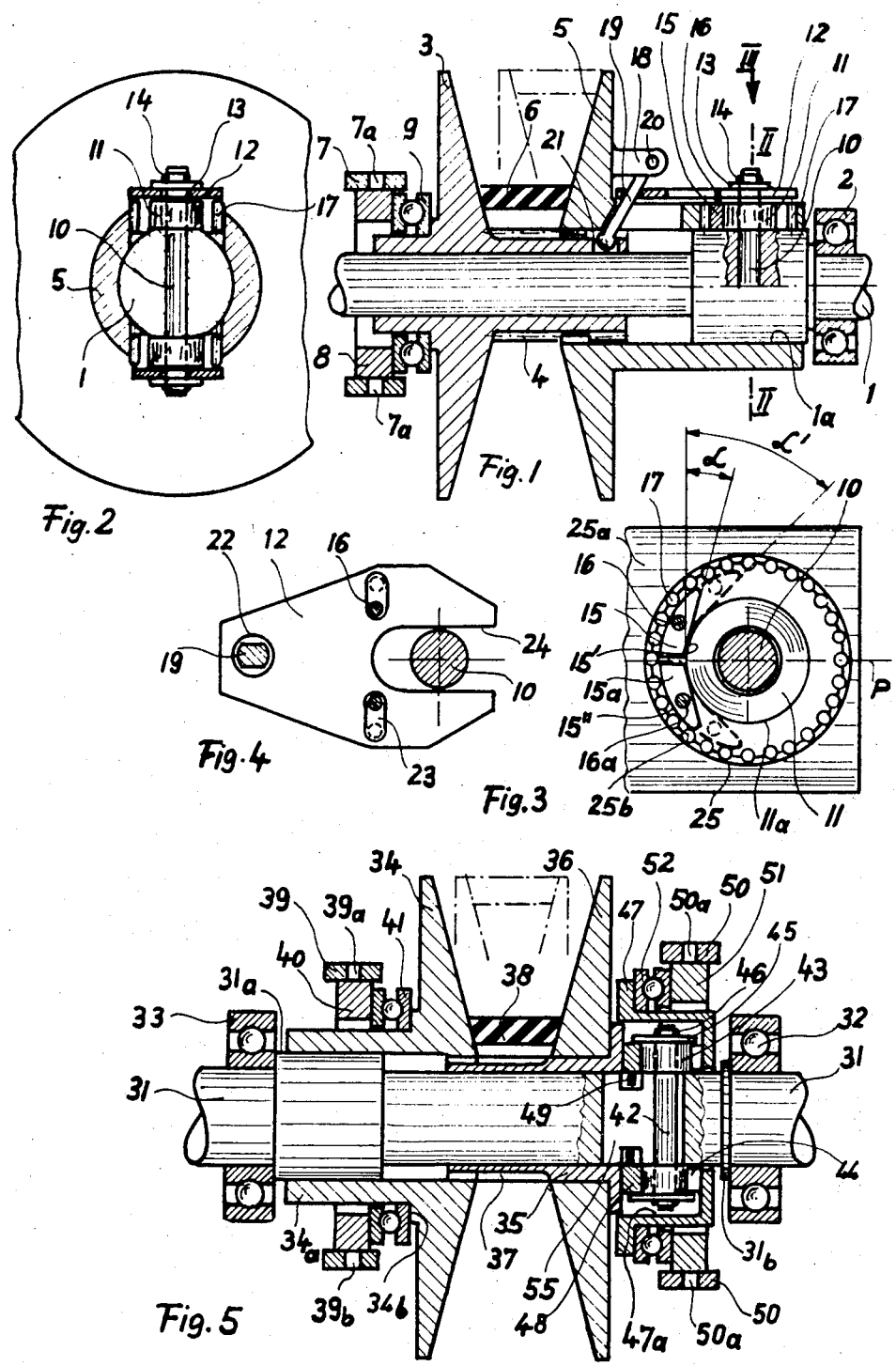

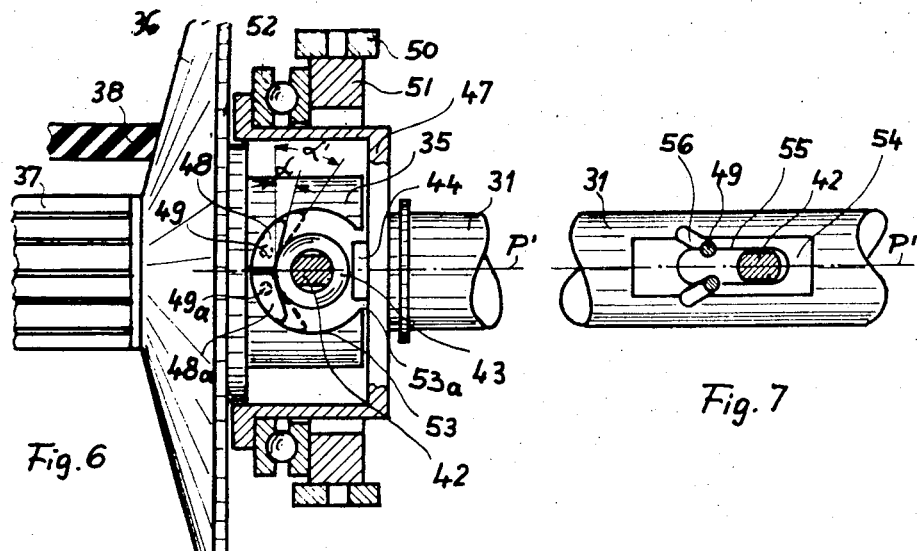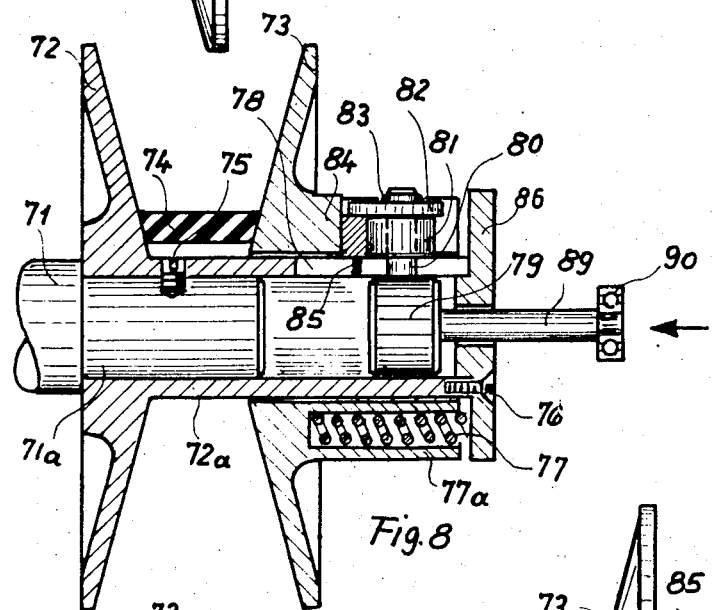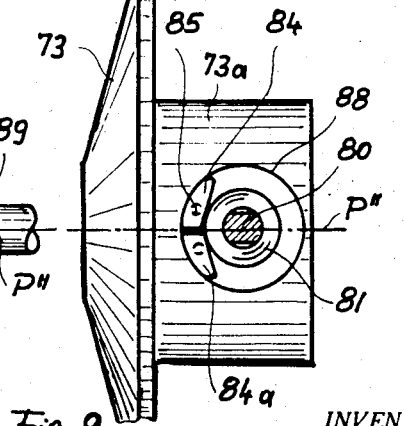

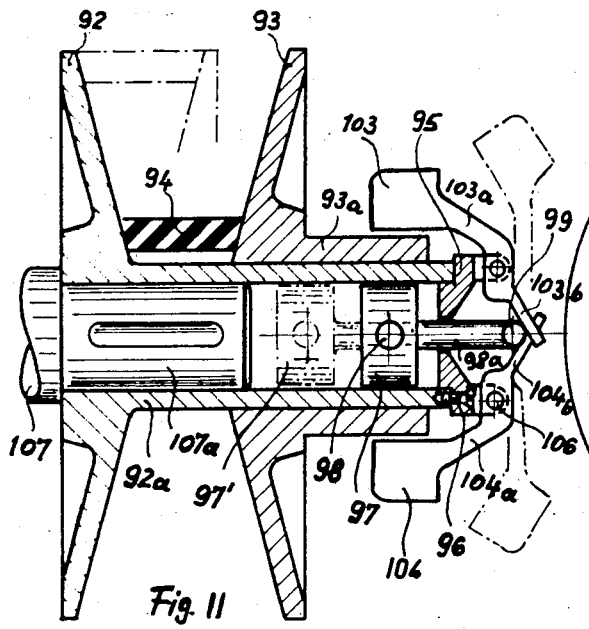
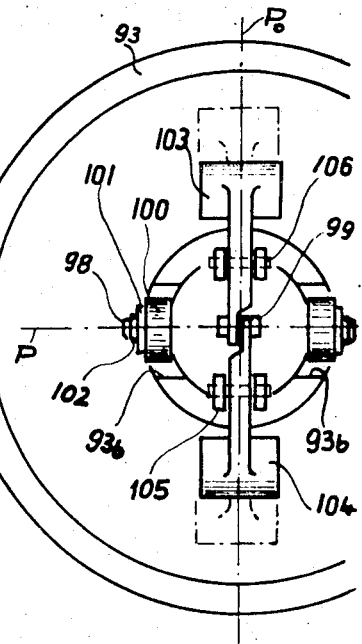
Fig. 11
Fig. 12
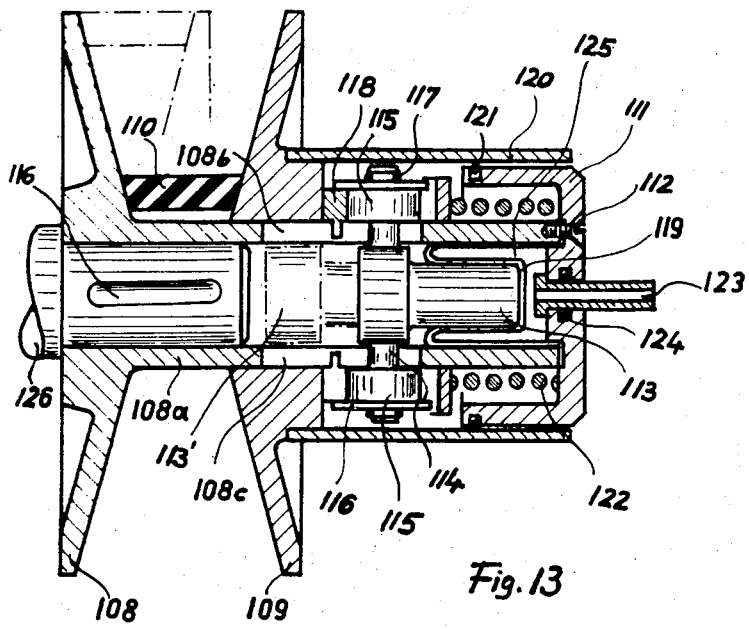
Fig. 13

AXIAL ACTUATOR AND FORCE CONTROL FOR ROTARY MEMBERS, ESPECIALLY VARIABLE SPEED DRIVES

FIELD OF THE INVENTION

My present invention relates to an axial actuator for rotating members or loads and, more particularly, to a torque-responsive contact-pressure control system for a variable-speed drive.

BACKGROUND OF THE INVENTION

It is frequently a problem, in the design of machine tools and other mechanisms to translate an actuator motion into an axial displacement of a rotatable load carried by a shaft, without transferring to the rotation thereof and to operate thereby a member of a clutch, brake or transmission. For example, a clutch may have a clutch disk which is keyed to the shaft and, upon axial displacement, couples the shaft with a driven member. A brake may have a disk keyed to the shaft which, upon axial displacement, engages a stationary member to slow or terminate shaft rotation. In addition, a number of variable-speed drives or transmissions have been provided heretofore which require axial actuation or control of axial pressure. The term "variable speed drive" is here used to refer to sheave-type machines in which a driven sheave or pulley is coupled to a driving sheave or pulley by a flexible member, generally an endless belt or chain. Since the transmission ratio between the sheaves, pulleys or sprockets is determined by the effective diameters of these rotatable members, namely, the ratio of these diameters, the concept of "pitch diameter" has been created to describe the effective diameter of a sheave, pulley or sprocket in terms of the diameter of the imaginary circle or track about which the flexible membrr is guided. In a fixed-diameter pulley, sheave, sprocket or other wheel, the flexible member may actually rest against a surface centered on the axis of rotation of the wheel and having the effective or pitch diameter.

Variable-pitch pulleys have been provided heretofore, especially for automotive and other machine applications, in which the pitch diameter, i.e., the effective diameter of the imaginary circle about which the flexible member is slung, can be varied by moving one disk of a sheave, etc. axially relative to the other. Where at least one disk of a sheave is frustoconical, e.g. tapers inwardly toward the axis and the opposite disk, a fixed-width flexible member (e.g. an endless chain V-belt) will engage the opposite walls of the sheave disk along imaginary circles whose effective diameters (pitch diameter) are a function of the axial spacing of the disks and hence the degree of movement of the shiftable disk.

Such drives are substantially infinitely variable and may have one or more variable-diameter sheaves. Also the effective or pitched diameters of the sheaves may be varied complementarily or independently and a wide range of transmission ratios established. Since these drives are relatively simple, easily repaired and mechanically convenient to manipulate, they have been used with considerable advantage in automotive vehicles and other machine systems. Reference may be made, in this respect, to British Pat. specification 818,607 and the present applicant's article entitled FMB-Variatoren, in TZ FUER PRACTISCHE METALLBEARBEITUNG 61, 1967, Heft 4, Seite 189/192, which respectively discusses V-belt and chain drives using the principles mentioned earlier.

One of the principal drawbacks generally encountered with variable-speed drives in particular and axial actuators in general has been that the pressure applied by the sheave to the endless member or conversely should be dependent upon torque or some other parameter and that control systems of the prior art, by reason of their design, initially possess considerable play or lost motion or develop such play with time. It will be apparent that, especially where control of the contact pressure applied to the endless member is essential, such play or lost motion can be disadvantageous. Furthermore, since the actuator or control is generally mounted upon the shaft about which the actuated member is rotatable, it has markedly increased the angular moment of inertia and introduced speed changes and centrifugal force phenomena which have proved to be undesirable.

OBJECTS OF THE INVENTION

It is therefore the principal object of the present invention to provide an improved axial actuator or torque-responsive contact-pressure controller which avoids the aforedescribed disadvantages.

Still another object of the invention is to provide an axial actuator or torque-responsive contact-pressure controller for rotating loads, which is mounted upon the load shaft, having small mass and little effect upon the moment of inertia of the rotating system.

Still another object of the invention resides in the provision of an actuator or torque-responsive contact-pressure controller of the character discribed, which has minimal play or lost motion.

An object of the invention is also to be found in the provision of a variable speed transmission, especially a belt or chain drive or variable-pitch-diameter sheaves with improved axial pressure control.

A more specific object of this invention is to provide a variable-speed/variable-ratio transmission having a sheave of variable-pitch diameter with at least one shiftable sheave disk and an improved actuator or torque-responsive contact-pressure controller therefor with low moment of enertia and little play, great reliability and simple and inexpensive construction.

SUMMARY OF THE INVENTION

These objects and others which will become apparent hereinafter, are attained, in accordance with the present invention, with an axial actuator or torque-responsive contact-pressure controller for a load rotatable about an axis on a load shaft, in which the actuator or torque-responsive contact-pressure controller comprises a pressure member of generally circular configuration, with a substantially radial axis (i.e. an axis extending radially with respect to the axis of rotation of the system), a hub mounted on the shaft and provided with a recess in the configuration of a surface of revolution, centered on a radial axis and having a soffit juxtaposed spacedly with the pressure pin, and a pair of shoes interposed between the pressure pin and the soffit while riding along the latter for controlling the relative axial displacements (in the direction of the axis of rotation of the system) of the pressure pin and the hub, thereby controlling the axial force which is applied to this hub upon torque change. According to the invention, the shoes are wedges having surfaces with radii of curvature corresponding to that of the soffit and bearing upon the latter without play, preferably through the intermediary of antifriction means in the form of bearings (e.g. needle or ball bearings) while the surface of each shoe or pressure-transmitting member in contact with the pressure pin is generally planar and tangential to the latter. The movement of the pressure shoes is controlled by a guide-slot system.

According to the principles of this invention, the load may be a movable disk of a sheave of variable pitch diameter which is keyed to its shaft for rotation jointly therewith about the axis of the system and has a hub provided with a generally radial opening defining the aforementioned soffit. The latter, which is preferably cylindrical or slightly conical with a radial axis, receives the pressure body which may be a roller or simply a pin and generally also has the configuration of a surface of of revolution, preferably a cylinder. Within this opening, lies a pair of pressure segments, identified earlier as shoes, which transmit force between the pressure pin and the hub to allow displacement of the latter. The shoes may move apart or together along the soffit of the opening to permit the spacing of the pressure pin and the center of the hub opening to vary during axial displacement of the movable disk. The axial movement, for purposes of actuation, is generated by any conventional means, by a lever arrangement, fluid-responsive system or the like, for positioning the pressure pin at a desired location, whereupon the movable disk of the adjustable sheave is caused to follow the movement of the pressure pin with a relationship determined by the positions of the pressure shoes. The pressure shoes assume wedging or contact angles which determine the ratio of movement of the hub and the pressure pin without lost motion or play.

The axial movement, which is applied to the variable-speed drive on ratio changes or speed changes, according to the invention, is produced in a usual manner by the setting mechanism operating on the pressure pin or upon one of the sheave disks and the axial forces generated upon the flexible member, e.g., the belt or chain, between the disks of the adjustable sheave is controlled by the pressure shoes in accordance with the invention. The pressure shoes or segments thus constitute wedges which assume positions corresponding to the desired contact-pressure changes without play. The term "contact-pressure ratio" is here used to define the ratio of the circumferential force to the axial force in the actuator system. The contact-pressure ratio is related to the forces generated by and upon the flanks of the flexible tension member which can be a smooth-flank V-belt, a steel chain with axially shiftable lamella or friction bodies or a friction ring, or some other elongated and preferably endless element whose flanks frictionally or matingly engage the surfaces formed by the sheave disks. The desired contact-pressure ratio is also a function of the use of the transmission. For example, different contact-pressure ratios may be required for a torque change or speed change in an automotive system than in some other arrangement or some other use of the transmission. To control the motion of the pressure feet or segments in response to the position and displacement of the sheave I may make use of a setting plate provided with slots in which pins of the pressure shoes are received. The slots, to accommodate movement of the pressure shoes outwardly and inwardly with respect to a medium axial plane of the system, through the radial axis of both the hub opening and the pressure pin, must extend away from one another and may have symmetrical patterns or asymmetrical patterns as the case may be. It will be evident that orientation of these slots determines the movement of the pressure shoes and hence the contact-pressure ratio in a simple manner. The guide slots for the pressure segments may, moreover, be provided in the drive shaft in an alternative construction.

Where it is necessary to prevent the pressure pin from withdrawing from the pressure shoes or segments with reduced tension at the belt or chain, I may provide a counteracting force for preventing such withdrawal or may simply dimension the guide slots to maintain the contact-pressure angle and the contact-pressure ratio. The pressure applied by the setting mechanism may, as indicated, be mechanical, e.g., through a thrust bearing, or may use a setting piston which is hydraulically, pneumatically or mechanically connected to the transmission or some part of the drive system for varying the contact pressure with the load, speed or other parameter.

Among the advantages of the transmission according to the present invention is that it is compact and composed of relatively simple structural parts, all of which can be disposed close to the transmission axis so that no significant centrifugal force develops because of these parts. Furthermore, the reduced moment of inertia permits rapid acceleration or deceleration of the drum. Finally, the setting mechanism receives only insignificant force from the movable disk of the adjustable sheave.

DESCRIPTION OF THE DRAWING

The above and other objects, features and advantages of the present invention will become more readily apparent from the following description reference being made to the accompanying drawing in which:

FIG. 1 is an axial cross-sectional view of an actuator according to the present invention, for a sheave of variable diameter or a V-belt transmission;

FIG. 2 is a cross-sectional view taken along the line II — II of FIG. 1;

FIG. 3 is a detail plan view, drawn to an enlarged scale and taken in the direction of arrow III in FIG. 1;

FIG. 4 is a detail view of a portion of the force transmitting means between the pressure shoes and the movable sheave disk;

FIG. 5 is a view similar to FIG. 1 but illustrating another embodiment of the present invention;

FIG. 6 is a detail view thereof in elevation, but partly broken away;

FIG. 7 is an elevational view of a portion of the shaft of FIG. 6;

FIG. 8 is an axial cross-sectional view illustrating another embodiment of the invention;

FIG. 9 is a plan view of the contact pressure device of FIG. 8;

FIG. 10 is a detail view of a portion of the system of FIGS. 8 and 9;

FIG. 11 is an axial cross-sectional view of a system according to the invention using a centrifugal controller;

FIG. 12 is an end view of the system of FIG. 11; and

FIG. 13 is an axial cross-sectional view wherein the contact-pressure controller is operated by pneumatic means.

In FIG. 1, I show a sheave for a variable-speed transmission of, for example, the type described in the aforementioned British Patent Specification, the sheave being journaled upon a shaft 1 which, in turn, is rotatably mounted via ball bearings 2 in the supporting housing not otherwise illustrated. The left-hand frustoconcial disk 3 of the sheave is axially shiftable along the shaft 1 and is coupled by splines 4 with the frustoconical disk 5, the latter being mounted upon the step 1a of the shaft 1 by its hub. A belt 6 is received between the disks 3 and 5 of the V-belt pulley.

A lever 7, operated from a point somewhat spaced from the transmission, is hingedly connected via pins or gudgeons 7a with a thrust ring 8 which bears via a thrust bearing 9 upon the hub of disk 3. When the ring 8 is shifted off the right, therefore, the gap between the disks 3 and 5 is reduced and the pitch diameter is increased as shown in dot-dash lines.

The torque on shaft 1 is transmitted to a radial pin 10 (FIG. 1 and 2), which rigidly connected with the shaft and has rotatable pressure rollers 11 at the opposite ends of the pressure pin projecting outwardly beyond the shaft. Each of these pressure rollers bears against a respective pair of pressure segments or shoes 15, 15a, symmetrically disposed on diametrically opposite sides of the shaft to the shoes, best seen in FIG. 3, and have the configuration of wedges, with planar surfaces 15' which are tangent to the circumference 11a of the respective pressure rod. In addition, the shoes 15, 15a have arcuate surfaces 15'' which converge toward the surfaces 15' on opposite sides of an axial medium plane P of the system with a radius of curvature corresponding to the radius of curvature of a soffit formed by an array of needle bearings 17 in an appropriate bearing cage.

The pressure rollers 11 thus bear against respective pairs of pressure shoes which are received in cylindrical openings 25 of a hub 25a of disk 5. Between the cylindrical surface 25b of the opening 25 and the shoes 15, 15a, there is received the needle bearing 17. Depending upon the torque direction and amplitude, on or the other of the shoes is predominantly pressed. The wedging angle $\alpha$, defined between a tangent to the pressure rod 11 perpendicular to the plane P and the plane of the surface 15', establishes the extent to which the wedges are cammed outwardly, i.e., upwardly or downwardly from the median plane P. The angle $\alpha$ may be the same for both directions of rotation as indicated, or different.

In FIG. 3, the position of the pressure shoes has been shown in solid lines for the smallest effective pitch diameter or smallest track of the V-belt. The broken-line position of the pressure shoes corresponds to the largest pitch diameter of the V-belt, illustrated in dot-dash lines in FIG. 1. In this position, the wedge angle $\alpha'$ is established. The positioning of the pressure shoes 15, 15a in dependence upon the imaginary effective circle of the V-belt (track) or pitch diameter, is effected via the setting plate 12 (FIG. 4).

The setting plate 12 comprises a pair of transverse slots 23, each of which receives a respective pin 16 or 16a of the pressure shoes 15 and 15a. The plate 12 is bifurcated by a longitudinal slot 24 which receives the pin 10 and permits axial displacement of this plate through the bore 22 at the left-hand end of plate 12, extends a rod 19 (FIGS. 1 and 4) which is swingably mounted in a bore 21 of the disk 3 for movement in the axial plane P about an axis generally tangential to the shaft 1. The rod 19 is articulated via a pin 20 to a lug 18 of the disk 5. Upon axial displacement of the disk 3 to the right, for example, the lever 19 pivots in a counterclockwise sense about a fulcrum 20 defined by the plate 12 and shifts the latter to the right. At the same time, the force applied to the plate 12 to the right permits the pressure shoes 15 and 15a to move outwardly into the broken line positions to alter the wedge angle from the value $\alpha$ to the value $\alpha'$ as illustrated in FIG. 3. Disk 13 and spring ring 14 retain the parts 11, 15, 17 and 12 against the effect of centrifugal force on pin 10. Consequently, when the system rotates and a torque change is encountered, the rod 11 bears upon one of the shoes 15, 15a at the increased angle $\alpha+\alpha'$ and a corresponding contact pressure is generated at the disk 5.

In FIGS. 5 and 7, I show another embodiment of the present invention wherein the shaft 31 is journaled in bearings 32, 33 on opposite sides of the sheave formed by frustoconical disks 34 and 36. The disk 36 is rigidly connected to its hub 35 and is angularly coupled via splines 37 with the disk 34 so that the disks 34 and 36 rotate jointly but are axially shiftable relative to one another. The disks 34 and 36 are rotatable and axially displaceable relative to the shaft 31 which has an enlarged step at 31a seated against the roller bearing 33 and a ring 31b received in a groove of the shaft and seated against the bearing 32. The axial spacing between the disks 34 and 36 determines the effective diameter (pitch diameter) of the loop formed by the V-belt 38 within the sheave, i.e., the belt track. A change in the effective pitch diameter can be produced by the lever 39 which, by analogy to lever 7, has pins 39a and 39b articulating it to a thrust ring 40 which clears the hub 34a of disk 34. The ring 40, in turn, acts upon the thrust bearing 41 which is seated against an annular shoulder 34b of disk 34. Movement of the disk 34 to the right, therefore, reduces the axial spacing of the disks 34 and 36 and causes the belt 38 to move outwardly to, for example, the dot-dash position shown in FIG. 5. A similar displacement can be imparted to the disk 36 by the lever 50 which is articulated by pins 50a to a thrust ring 51 clearing the torque-responsive axial-pressure control arrangement. The ring 51, in turn, acts upon a thrust bearing 52 which bears upon a flange 47 of a cup-shaped housing or sleeve surrounding the axial-pressure control arrangement and represented at 47a. The levers 50 and 39 may, of course, be interconnected for complementary movement.

The torque applied to shaft 31 is delivered to a radial pin 42, snugly received in a slot 55 of the shaft 31, but projecting outwardly thereof to receive pressure rollers 43 best seen in FIG. 5 and 6. The pressures rollers 43 are journaled on the ends of pin 42 and are held in place by washers 45 and spring rings 46 to prevent parts 43, 48 and 44 from shifting outwardly by centrifugal force.

The pressure rollers 43 bear upon the planar surfaces of a pair of pressure segments or shoes 48, 48a which slide along the soffit of a cylindrical opening 53 in the hub 35. The opening 53 is a cylindrical segment providing a passage 53a at its right-hand end, through which a bearing block 44 on the housing 47,47a projects to support the pressure rod 43 against axial movement to the right.

The wedge angle $\alpha$ corresponds again to the smallest pitch diameter of the belt and sheave and, therefore, to the smallest belt track defined by the latter, while the large contact angle $\alpha'$ corresponds to the largest pitch diameter and track represented in dot-dash lines in FIG. 5. The movement of the pressure shoes 48, 48a in dependence upon the transmission ratio of the drive is effected, as is clear from FIG. 7, by a pair of slots 56 which are inclined to the median plane P' and to the axis of the shaft 31. The slots 56 open into the axially extending slot 55 and receive pins 49, 49a which depend from the pressure shoes. The movement of the pin 42 in slot 55 is a function of the change in the track of the V-belt. Shaft surface 54 is formed as a flat to slidably receive parts 43, 44 and 48, 48a.

In FIGS. 8 – 10, we show yet another embodiment of the invention wherein the pair of sheave disks 72 and 73 are angularly coupled to the shaft 71 by a setscrew 75. The disk 72 is provided with a longitudinally extending hub 72a reaching beneath the disk 73 and in which the shaft 71 is received. Beyond the stub 71a of this shaft, the hub 72a also receives a plunger or piston 79 which is axially shiftable with a thrust taken up at the bearing 90 which may be connected to a lever or other setting device. The hub 72a is also provided at diametrically opposite locations with two open longitudinally extending slots 78 (FIGS. 8 and 10) in which a pressure pin 80 is received. The pin 80 is mounted upon the head of piston 79 and is formed, on its end projecting from the hub 72a, with the pressure roll 81. The latter is held in place by a washer 82 and a spring ring 83. The spring ring holds the pressure roll 82 slidably against the outer surface of the hub 72a.

As shown in FIG. 10, on opposite sides of the longitudinal slots 78 through which the pin 80 projects, the hub 72a is provided with a pair of guide slots 87 and 91 which are here shown to be inclined to the plane P", but are asymmetrical with respect to this plane. Pins 85 of segmental pressure shoes 84 and 84a are slidably received in the slides 87 and 91, the pressure shoes sliding along the soffit of a cylindrical or slidably conical opening 88 formed in the hub 73a of disk 73. When the belt 74 is in its solid-line position shown in FIG. 8, corresponding to its smallest track, the segments 84 and 84a assuming the position illustrated in solid lines (small wedge or attack angle) and are disposed symmetrically to opposite sides of the plane P". When, however, the belt 74 is in its longest track position shown in dot-dash line in FIG. 5, the angle of attack of the pressure roll 81 upon the shoes 84 or 84a is at its greatest.

The differing orientations of the asymmetrical slots 87 and 91 permitting shoes 84 and 84a, upon axial movement of the pin 80, to define different wedge or attack angles. The effect of torque in opposite senses is thus to develop different axial forces which are applied to the flanks of the belt.

The torque of shaft 71 is applied via the hub 72a of disk 72 to the pin 80 and from the pressure roll 81 of the latter to the shoe 84 or 84a which, as already noted, assume different wedge angle or angles of attack to transform the torques into an axial force applied to the flanks of the belt. The reaction force is taken up by the setting piston 79 via the piston rod 89 and the bearing 90 which, as noted, can be adjustably positioned by a suitable mechanism. The end plate 86 is centered by a screw 76 on the end of hub 72a and is fastened there to support an axially extending compression spring 77 received in the spring housing 77a of the disk 73 to maintain an axial bias upon the latter to the left and produce a prestress upon the belt.

In FIG. 11, I show a V-belt sheave which consists of two frustoconical disks 92 and 93 mounted upon a shaft 107. A key 107a anchors the disk 92 angularly to the shaft while the disk 93 is axially shiftable upon the illustrated hub 92a of disk 92. Two longitudinal slots are provided in the hub 92a of disk 92 at diametrically opposite locations (not visible in FIGS. 11 and 12) to receive the pin 98 whose pressure rolls 100 are mounted upon the pin outwardly of this hub. The pressure rolls are resiliently held in place by washers 101 and spring rings 102 seen in FIG. 12.

The disk 93 is provided in its hub 93a with cylindrical openings 93b in which the pressure rolls 100 are received together with a pair of pressure segments or feet, not shown, similar to the feet 48, 48a previously described. In this case, the torque transmission from shaft 107 is transferred via disk 92 to the disk 93. The positions of the segments, which are determined by the track of the V-belt 94 as previously described, is established by the axial force developed by a pair of centrifugal weights 103. 104 which lie in a plane $P_o$, offset by 90° from the median plane P mentioned earlier. The weights 103 and 103 are mounted upon arms 103a and 104a, respectively, fulcrumed at 106 on a cover plate 95 for the hub 92a. The cover plate 95 has bifurcated lugs 105 providing pivotal mounting for the arms 103a, 104a.

The cover 95 is attached by screws 96 to the end of the hub 92a and receives with clearance the piston rod 98a of a plunger or piston 97 to which the pin 98 is anchored. The rod 98a is provided at its free end with a camming roller 99 which bears upon tongues 103b and 104b of the arms 103a and 103b. The position of the weights 103, 104 is of course determined by the angular velocity of the sheave 92, 93 and is translated into an axial force upon the piston 97. Thus, the axial pressure developed upon the belt 94 is established by the level of the reaction force generated by weights 103, 104 at the piston 97, this level being so selected that the desired axial pressure for any given speed of the sheave is provided, as is particularly desirable for the automotive vehicle applications.

In FIG. 13, the sheave disk 108 is again rotatably entrained by the shaft stub 106, while the frustoconical disk 109 is axially shiftable upon the hub 108a of disk 108. The pin 114 is slidably received in a pair of diametrically opposite longitudinal slots 108b and 108c of the hub 108a and is provided with rolls 115 on the opposite extremities of the pin. The rolls act against pressure segments or feet 118 similar to those shown at 48 and 48a and received in cylindrical openings of the hub of the disk 109. The washers 116 and spring rings 117 resiliently retain the rolls 115 in place against the action of centrifugal force.

The pin 114 is anchored to the piston 113 which has a neck hugged by a rollable flexible membrane 119 whose outer edge is fastened by a cover 111 to the end of the hub 108a to define a sealed compartment 125. The cover 111 is fixed to the hub 108a by screws 112.

A sleeve fitting 123 extends from the cover plate 111 through a seal 124 and supplies a pressure medium to this chamber 125. The pressure medium may be drawn from a hydraulic or pneumatic pressure transducer having an output pressure which is proportional to the speed of the shaft or the torque. A suitable transducer is a pump coupled with an accumulator and connected to the shaft. A valve may be provided in this circuit to adjust the pressure to the desired response characteristic. A spring 122 applies between the disks 108 and 109 an axial prestress so that the belt 110 is held with a predetermined minimum pressure even when the system is freewheeling. A sleeve 120, with seal 121, prevents contaminants from entering the system. While axial displacement of the sheave disks may be provided by other means, the track of the belt and position of the disk 109 may simply be established by the pressure medium introduced into the system. A slot arrangement may be provided to guide the pressure shoes as previously described.

I claim:

1. An axial actuator for a load rotatably entrained by a shaft having an axis of rotation, said actuator comprising:
   a sleeve axially shiftable on said shaft and coupled with said load for applying axial force thereto, said sleeve being formed with an opening defining a surface of revolution corresponding to its soffit and centered upon an opening axis perpendicular to said axis of rotation;
   a generally radial pressure pin axially shiftable relative to said shaft and received in said opening with spacing from said soffit, said pin being angularly shiftable relative to said sleeve;
   a pair of pressure segments between said soffit and said pin received in said opening and movable along said soffit in opposite directions while being adapted to bear against said pressure pin with an angle of attack determined by the position of each segment along said soffit; and
   means for adjusting the positions of said segments along said soffit.

2. The axial actuator defined in claim 1 wherein said load is part of a variable-speed drive having a sheave of adjustable pitch diameter mounted on said shaft, said sheave comprising a pair of generally frustoconical disks including at least one axially shiftable disk for applying pressure to a flexible element received between said disks and engaging same along tracks of a diameter determined by the relative spacing of said disks, said sleeve constituting a hub on said one of said disks, said means for adjusting the positions of said segments along said soffit being operatively connected with said disks for establishing said positions in accordance with the disk spacing and the size of the track of said flexible element on said sheave.

3. The variable speed drive defined in claim 2, further comprising a roller bearing between said pressure segments and said soffit of said opening.

4. The variable speed drive defined in claim 2 wherein said segments each are provided with a respective guide pin, said means for adjusting the positions of said segments along said soffit including a body provided with guide slots extending outwardly from a median axial plane between said soffit and slidably receiving said guide pins.

5. The variable speed drive defined in claim 4 wherein said body is a plate and said slots are formed in said plate and extend transversely to said plane, said means for adjusting the positions of said segments along said soffit further comprising a lever hingedly interconnecting said disks for joint complementary axial displacement, said plate engaging said lever.

6. The variable speed drive as defined in claim 4 wherein said body is a portion of said shaft and said slots are inclined to the shaft axis.

7. The variable speed drive as defined in claim 6 wherein said slots are asymmetrical with respect to said plane.

8. The variable speed drive as defined in claim 2, further comprising a setting mechanism acting upon said pressure pin and retaining same against movement away from said segments.

9. The variable speed drive as defined in claim 8 wherein said setting mechanism includes a plunger carrying said pressure pin and an axially extending rod connected with said plunger and shiftable externally of the drive for controlling said pressure pin.

10. The variable speed drive as defined in claim 9 wherein said mechanism further comprises centrifugally displaceable weights acting upon said rod.

11. The variable speed drive as defined in claim 8 wherein said setting mechanism comprises fluid-responsive means acting upon said pressure pin.

* * * * *